(12) United States Patent
Martin

(10) Patent No.: US 11,747,274 B2
(45) Date of Patent: Sep. 5, 2023

(54) GAS SENSOR WITH LONG ABSORPTION PATH LENGTH

(71) Applicant: Senseair AB, Delsbo (SE)

(72) Inventor: Hans Martin, Delsbo (SE)

(73) Assignee: Senseair AB, Delsbo (SE)

(*) Notice: Subject to any disclaimer, the term of this patent is extended or adjusted under 35 U.S.C. 154(b) by 0 days.

(21) Appl. No.: 17/904,946

(22) PCT Filed: Feb. 12, 2021

(86) PCT No.: PCT/SE2021/050119
§ 371 (c)(1),
(2) Date: Aug. 24, 2022

(87) PCT Pub. No.: WO2021/173055
PCT Pub. Date: Sep. 2, 2021

(65) Prior Publication Data
US 2023/0117008 A1    Apr. 20, 2023

(30) Foreign Application Priority Data
Feb. 27, 2020  (SE) .................... 2050221-7

(51) Int. Cl.
*G01N 21/3504* (2014.01)
(52) U.S. Cl.
CPC . *G01N 21/3504* (2013.01); *G01N 2201/0636* (2013.01)
(58) Field of Classification Search
CPC .............. G01N 21/3504; G01N 2201/0636
See application file for complete search history.

(56) References Cited

U.S. PATENT DOCUMENTS

2009/0039267 A1   2/2009   Arndt et al.
2009/0235720 A1*  9/2009   Smith ............... G01N 21/3504
                                                         73/31.05
(Continued)

FOREIGN PATENT DOCUMENTS

CN     1228839 A    9/1999
CN   101449143 A    6/2009
(Continued)

OTHER PUBLICATIONS

International Search Report and Written Opinion in PCT/SE2021/050119 dated Apr. 20, 2021 in 13 pages.
(Continued)

*Primary Examiner* — David P Porta
*Assistant Examiner* — Meenakshi S Sahu
(74) *Attorney, Agent, or Firm* — Knobbe Martens Olson & Bear LLP

(57) ABSTRACT

A gas sensor (1) is described comprising a light source (2), and a detector (4), a first reflector (7), which is concave and arranged to reflect and concentrate light emitted from the light source (2) to a first light spot (31), and an interference filter (5). The gas sensor comprises a second reflector (8), a third reflector (9), which is concave, and a reflector base (37) with a dome shaped surface (17) with the first and third reflectors facing the light source (2) and the detector (4). During operation of the gas sensor (1), the detector (4) is illuminated by light from the light source (2), which in an optical path from the light source (2) has been reflected at least once in each one of the first reflector (7), the second reflector (8), and the third reflector (9). The gas sensor (1) is configured for detection of a first wavelength portion of the light.

23 Claims, 3 Drawing Sheets

(56) References Cited

U.S. PATENT DOCUMENTS

2018/0120222 A1\* 5/2018 Fritz ................. G01N 21/3504
2018/0120223 A1 5/2018 Marta et al.

FOREIGN PATENT DOCUMENTS

| | | |
|---|---|---|
| CN | 102803936 A | 11/2012 |
| CN | 105319176 A | 2/2016 |
| EP | 2784485 A1 | 10/2014 |
| GB | 2395259 A | 5/2004 |
| KR | 101720944 B1 | 4/2017 |
| WO | WO 98/09152 A1 | 3/1998 |
| WO | WO 2006/029920 A1 | 3/2006 |
| WO | WO 2007/091043 A1 | 8/2007 |
| WO | WO 2018/038491 A1 | 2/2018 |

OTHER PUBLICATIONS

Office Action for Chinese Application No. 202180016930.4 dated Mar. 18, 2023 with translation in 17 pages.
Cited Provisions from Office Action for Chinese Application No. 202180016930.4 dated Mar. 18, 2023 in 1 page.

\* cited by examiner

GAS SENSOR WITH LONG ABSORPTION PATH LENGTH

TECHNICAL FIELD

The present invention relates to gas sensing, in particular gas sensors such as non-dispersive infrared (NDIR) gas sensors having a radiation source, radiation detector and an absorption path with an absorption path length realized by a reflector arranged to reflect radiation from the radiation source to the radiation detector.

BACKGROUND ART

Optical sensing using the absorption bands of various gases in the visible or infrared wavelength range is a method to characterize the content of a gas.

In order to measure the content of a gas by using the absorption bands in a compact unit, the measurement may be performed in a cavity with reflecting surfaces which by several reflections result in an optical path that is considerably longer than the unit itself. Thereby the length, along which radiation from a provided radiation source interacts with the gas, can be increased and the sensitivity of the detection of the gas content can be increased.

To characterize the content of a specific gas it is considered to be advantageous to perform the measurement at a wavelength in which the an absorption band of the specific gas can be measured singularly, thereby minimizing the simultaneous measurement of other gases having similar absorption bands. This will in numerous cases limit the useable wavelengths to measure. In some cases equipment, such as radiation sources and sensors, suitable to measure in the suitable wavelengths are expensive or cumbersome.

It is a known problem that the low concentrations of gas that is provided in sniffing applications require high resolution and high sensitivity in order to detect the limited quantities provided.

In the field of gas sensing, there is a requirement for small, low cost gas sensors that can operate over a wide range of environmental conditions. This is driven by legislation directed to increasing safety and reducing emissions in a variety of applications. For example, in the automotive industry, sensing of the presence of automotive exhaust gases and CO2 in vehicle cabins and engine management systems are applications where a small form factor as well as low cost and efficiency are desirable. The need for detection of CO2 in vehicle cabins comes from the move towards CO2 refrigerant based air conditioning systems away from the use of more environmentally harmful Fluorocarbon based refrigerants such as P134a. By providing CO2 based air conditioning systems, automotive manufacturers will be able to avoid penalties applied to the disposal and recycling of hydrofluorocarbons. However, conventional gas sensors suitable for CO2 and CO gas sensing are too large and too expensive for use in such automotive applications. Furthermore, in such applications, the gas sensor is required to operate over a wide range of temperatures.

US2009/0235720 describes a dome gas sensor comprising a radiation source; a radiation detector; and a reflecting means, preferably in the form of a dome, arranged to reflect radiation from the radiation source to the radiation detector along an optical path, wherein the radiation source and the radiation detector are disposed side by side. Preferably, a screen, configured to reflect radiation, is disposed in line with and between the radiation source and the radiation detector. The light from the radiation source is to be reflected in the dome towards the radiation detector.

SUMMARY OF THE INVENTION

An object of the present invention is to provide gas sensor comprising a radiation source, a radiation detector and reflecting means, which gas sensor has an absorption path with a considerably longer path length compared to the dome gas sensor described in US2009/0235720, for the same exterior dimensions.

Another object of the present invention is to provide gas sensor comprising a radiation source, a radiation detector and reflecting means, which gas sensor has a simpler construction with a smaller number of components, compared gas sensors according to the prior art.

Another object of the present invention is to provide a gas sensor which can be produced at a low cost and which has a mechanically robust design, while still providing a long absorption path length compared to the gas sensors of the prior art.

According to a first aspect of the invention a gas sensor is provided comprising a light source configured to emit light, and a detector configured to detect light, wherein the light source and the detector are arranged side by side, a first reflector, which is concave and arranged to reflect and concentrate light emitted from the light source to a first light spot, on the side of the light source, wherein the gas sensor is configured for detection of a first wavelength portion of the light. The gas sensor is characterised_in that it comprises a second reflector, a third reflector, which is concave, and a reflector base with a dome shaped surface facing the light source and the detector. The first reflector and the third reflector are arranged as reflective surfaces on the dome shaped surface. The second reflector and the third reflector are arranged such that the first light spot is on the second reflector and light reflected from the first light spot onto the third reflector is reflected and concentrated by the third reflector to a second light spot on the side of the first light spot. The gas sensor is arranged such that, during operation of the gas sensor, the detector is illuminated by light from the light source, which in an optical path from the light source has been reflected at least once in each one of the first reflector, the second reflector, and the third reflector filter. The gas sensor is arranged such that gas to be sensed may enter into the optical path.

By having the gas sensor arranged such that light from the light source is reflected at least once in each one of the first reflector, the second reflector, and the third reflector before hitting the detector, the optical path length is increased in comparison to the optical path length of similar gas sensors of the prior art.

As the first reflector and the third reflector are arranged as reflective surfaces on the dome shaped surface the first reflector and the third reflector are also dome shaped.

A gas sensor according to the first aspect of the invention has many advantages. Firstly, the reflector base and the arrangement of the reflectors as reflective surfaces on the dome shaped surface provides a rigid support for the reflectors. The provision of a dome shaped surface makes it possible to have reflectors with a large surface, which in turn enables the omission of any collimating optical elements in front of the light source or the detector. The reason for this is that large reflectors may collect light from a large solid angle. The omission of collimating optical elements provides for a low cost gas sensor which is easily assembled without the need for any alignment of the optics. The reflector base may also form a structural part of the gas sensor, such that additional structural elements for support of the first and second reflector may be omitted. Another benefit is that the thermal properties are stable with a reflector base with a dome shaped surface facing the detector and the light source, especially when optical collimation elements are omitted. When optical collimation elements are omitted no alignment of the optical elements is necessary during assembly of the gas sensor.

The gas sensor may be configured for detection of a first wavelength portion of the light in different ways. According to a first alternative the light source and the detector together may limit the wavelength sensitivity range. This may be due to the light source emitting only in a specific wavelength band and/or due to the detector detecting only in a specific wavelength band. The specific wavelength bands together results in a detection only in the first wavelength portion. It might be difficult to provide a detection of the first wavelength portion for any wavelength. According to a second alternative an interference filter may be used to filter out the first wavelength portion. An interference filter may be constructed for any desired wavelength in the infrared region suitable for gas sensing.

The reflector base may be formed as a unitary element. With the reflector base formed as a unitary element the mechanical rigidity of the reflector base is not affected by any joints in the reflector base. The mechanical rigidity of the reflector base is thus optimized for given dimensions of the reflector base.

The light source may be configured to emit un-collimated light. By having the light source configured to emit un-collimated light the alignment of the gas sensor is facilitated. The function of the gas sensor is very insensitive to the positioning of the light source in relation to the first reflector when the light source is configured to emit un-collimated light. Also, a light source configured to emit un-collimated light is slightly less expensive and occupies slightly less room than a light source configured to emit collimated light.

The gas sensor may comprise an interference filter configured for a first wavelength portion of the light, wherein the gas sensor is arranged such that, during operation of the gas sensor, the detector is illuminated by light from the light source, which has been filtered by the interference filter.

By the interference filter being configured for a first wavelength portion of the light is meant that a first wavelength portion of the light is either transmitted or reflected by the interference filter depending on whether the interference filter is a transmittance filter or a reflectance filter. By the light being filtered by the interference filter is meant that a first wavelength portion of the light is passed on by the interference filter in the optical path of the gas sensor. In case the interference filter is a transmittance filter the light that passes the interference filter is within the first wavelength region. The light outside the first wavelength region is either reflected or absorbed by the interference filter. In case the inference filter is a reflectance filter the light that is reflected in the filter is within the first wavelength region. The light outside the first wavelength region is either transmitted or absorbed by the interference filter.

The interference filter may be configured as a bandpass, or notch filter, wherein the bandpass or notch wavelength corresponds to an absorption peak of the gas that is to be measured. By measuring the signal strength at the detector the concentration of the gas may be determined.

The interference filter may be arranged in front of the detector and be configured to only transmit the first wavelength portion of the light. With the interference filter arranged in front of the detector the light passes the interference lastly in its optical path from the light source to the detector. This makes it less important to take care of any reflections from the interference with a wavelength outside the first wavelength region as such reflections will be filtered by the interference filter before hitting the detector. If the interference filter is arranged as a reflectance filter in the gas sensor any unwanted reflections in the cavity before the interference filter might be of more problem as any light from unwanted reflections that hit the detector comprises wavelength over the entire wavelength span of the light source.

The interference filter may be arranged after the light source and be configured to only transmit the first wavelength portion of the light. Similarly to the case with the filter in front of the detector the problem with unwanted reflections is no big problem as only light in the wanted wavelength region will leave the light source.

As mentioned above the interference filter may be arranged as one of the reflectors and may be configured to only reflect the first wavelength portion of the light. The problem with having the interference filter as one of the reflectors is that it has to be made concave which is more difficult compared to making a flat interference filter.

In case the interference filter is arranged as one of the reflectors it is favourable to arrange the interference filter as the second reflector as the light is focused on the second reflector. Thus, the flatness of the second reflector will not have a large impact on the function of the gas sensor. It is, however, slightly more favourable to have the interference filter in another position than as the second reflector.

The second reflector may be flat also in the case when it is not an interference filter. As mentioned above the curvature of the second reflector has only a minor impact on the function of the gas sensor.

To achieve the optimum quality of the gas sensor, the second reflector is preferably concave.

The interference filter may be a bandpass filter configured to band pass light with a wavelength around 2.66 µm for the detection of an $H_2O$ peak, around 3.32 µm for the detection of a methane peak, around 4.26 µm for the detection of a $CO_2$ peak, or around 4.50 µm for the detection of an $N_2O$ peak. It is of course possible to choose other wavelengths to suit the absorption peaks of other gases.

If the light source is positioned at a distance of the radius of curvature from the dome shaped reflector base, then all spots mentioned are 1:1 images of the light source formed on essentially the same plane as the light source, detector, and the second reflector surface. The separation between reflector one and three determine the number of spots formed on the surface of mirror two. That means, in principle we can by design get as many spots we like on the second reflector that we think is good for the sensor performance. For instance, the detector may be arranged such that the second light spot is on the detector. With such a configuration the light travels the distance from the plane of the detector and light source to the surface of the dome shaped reflector base 4 times, which in principle doubles the distance in comparison with similar gas sensors of the prior art.

Alternatively, the second reflector may be arranged such that the second light spot is on the second reflector, and wherein light reflected from the second light spot on the second reflector is reflected via the first reflector to a third light spot on the second reflector, and reflected from the second reflector via the third reflector to a fourth light spot. With such a configuration the light travels the distance from the plane of the detector and light source to the surface of the dome shaped reflector base 8 times.

With additional reflections the absorption path length is increased and thus also the sensitivity of the gas sensor. However, due to reflection losses the amount of light in each consecutive light spot decreases. The decrease is also affected by the light spot getting bigger for each reflection, due to spherical aberration and imperfections in the reflectors. Thus, eventually the light spot will become so big that a considerable amount of the light falls outside the detector area. This will lead to a decrease in the signal strength and thus also in the sensitivity of the gas sensor. Consequently, for any predetermined hardware, and set of mirrors, there is an optimum number of reflections, and optical path length, for reaching highest detector signal-to-noise ratio, which directly correlates to the achievable gas sensor resolution.

The detector may be arranged such that the fourth light spot is on the detector. This is a good compromise in order to achieve a reasonable size of the light spot at the same time as a long absorption path length.

Each one of the first reflector, and the third reflector has a respective centre of curvature, wherein the centre of curvature of the first reflector is at a distance from the centre of curvature of the third reflector, said centres of curvature forming a first axis, wherein the centre of the light source is displaced from the centre of curvature for the first reflector. By arranging the centres of curvature in this way the consecutive light spots end up in different positions.

The centre of the light source may be displaced from the centre of curvature for the first reflector along the first axis as well as transverse to the first axis. By arranging the light source displaced transverse to the first axis the consecutive light spots will end up on the different side every second time and on the same side every second time. This may facilitate the positioning of the detector.

The radii of curvature of the first reflector, and the third reflector may be essentially equal. This gives the best optical performance.

The second reflector may also be curved and may also have the same radius of curvature as the first reflector and the third reflector.

At least one, preferably all of the first reflector, the second reflector and the third reflector are spherical reflectors. This is a form of the reflectors that is easy to produce. However, even better optical properties may be achieved with aspherical reflectors, such as ellipsoid reflectors. It is primarily the spherical aberrations that might be lowered with aspherical reflectors. The shape of the reflectors is determined primarily by the reflector base as the reflector itself is only a reflective layer on the reflector base. The reflective layer may be made of any suitable metal.

Each one of the first reflector and the third reflector occupies a solid angle of at least 1 steradian, preferably at least 2 steradians seen from the centre of curvature of the respective reflector. In order not to lose too much light from the light source it is important that the first reflector and the third reflector occupy as large solid angle as possible. The second reflector has to occupy a sufficiently large area in order to cover all light source spots imaged on the second reflector surface by the first and the third reflectors. Hence the size of the second reflector depends on the size of the light source emitting area, in combination with the image spot separations, which along the direction of light source and detector approximately equals the separation distance divided by the spot number at the detector location.

When using surface mount (SMD) components for light source and detector the minimum spot separation feasible is for practical reasons limited by the size of the light source and detector packaging. A more dense spot pattern can be achieved using for instance flip-chip component assembly, or similar chip sized mounting technology. That is for the purpose of reducing spherical aberration much preferred, if possible, since all emitter images in this case can be designed to fall close to the centre of radius for the dome reflectors. This opens up the possibility to build the complete NDIR gas sensor on a lead frame and then mould the base plane to create a miniaturized SMD gas sensor where the dome reflector is added as a top cover.

The light source may be configured to emit mid infrared light, preferably light with a wavelength shorter than 5 µm. This is preferable for detection of the different gases exemplified below.

The light source may comprise a black body radiator and a filter arranged to allow only mid infrared light to be emitted from the light source. The mid-IR radiation may have a wavelength below 4 µm, below 5, µm, or below 6 µm.

The detection of a wavelength peak may be performed in a detection span surrounding the wavelength peak. The detection span may be centred on the wavelength peak of the detection span may comprise the wavelength peak. The width of the detection span may for example be 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, or 10% of the wavelength of the wavelength peak. The width of the detection span may be defined by the full width at half maximum, FWHM.

The reflector base may be made from moulded plastic. This alternative provides for a low cost reflector base. It is of course possible to manufacture the reflector base in other ways, such as by machining reflector base from a metal block.

The sensor, the detector and the second reflector may be arranged on a common base, wherein the reflector base is attached to the base to form the gas sensor. This facilitates the mounting of the gas sensor as the sensor, detector and the second reflector then firstly may be attached to the common base followed by the attachment of the reflector base with the first and third reflector. The common base may also be a unitary moulded piece of plastic.

The detector may comprise a photodiode. The photodiode may be tuned to be more sensitive in a wavelength span of interest than in a wavelength span not of interest.

In the following preferred embodiments of the invention will be described with reference to the appended drawings.

DETAILED DESCRIPTION

Figure 1:
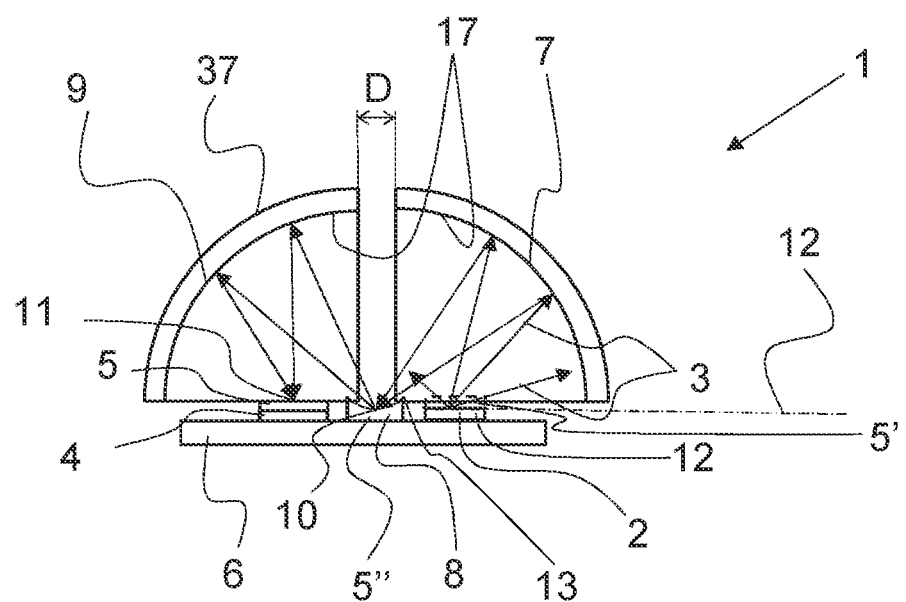
FIG. 1 shows schematically a gas sensor according to an embodiment.

In the following description of preferred embodiments similar features in the different drawings will be denoted with the same reference numerals. The drawings are not drawn to scale.

FIG. 1 shows schematically a gas sensor 1 according to an embodiment of the invention. The gas sensor comprises a light source 2 configured to emit un-collimated light 3, and a detector 4 configured to detect light 3. As can be seen in FIG. 1 the light source and the detector are arranged side by side. Thus, essentially no direct light from the light source 2 hits the detector 4. To prevent any direct light from the light source 2 to hit the detector 4, the plane 12 of the light source is lower than the top 13 of the second reflector 8. An interference filter 5 is configured in front of the detector 4 and is configured to transmit a first wavelength portion of the light and to reflect or absorb light outside of the first wavelength portion. The interference filter 5 is preferably a band pass filter. For detection of carbon dioxide the band pass filter preferably transmits light in a narrow band centred around 4.3 µm. The band pass filter is chosen to match the gas to be detected.

The gas sensor comprises a common base 6 on which the light source 2 and the detector 4 are arranged side by side. The light source is shown schematically in FIG. 1. The light source emits un-collimated light as is indicated by the different arrows 3 in FIG. 1. The light source may be implemented in many different ways as is exemplified below. The gas sensor also comprises a first reflector 7 which is concave, a second reflector 8, and a third reflector 9 which is concave. The light source 2 may be configured to emit un-collimated light, which enables the use of a low cost light source. Another benefit with using an un-collimated light source is that it does not need any accurate alignment to the reflectors. Alternatively, it is possible to use a collimated light source. The second reflector is arranged on the common base 6. The gas sensor also comprises a reflector base 37 comprising a dome shaped surface 17 facing the light source 2 and the detector 4. The first reflector 7 and the third reflector 9 are arranged as reflective surfaces on the dome shaped surface 17 on the reflector base 37. The reflector base 37 may be formed as a unitary element. The reflector base 37 may then be made as a moulded piece of plastic and provides a rigid base for the first reflector 7 and the third reflector 9. The reflector base 37 is attached to the base and forms a rigid structure which needs no alignment.

The first reflector is arranged to reflect and concentrate light emitted from the light source 2 to a first light spot 10, on the side of the light source, which is on the second reflector 8. The second reflector 8 and the third reflector are arranged such that light reflected from the first light spot 10 onto the third reflector 9 is reflected and concentrated by the third reflector to a second light spot 11 on the side of the first light spot 10, which in the embodiment in FIG. 1 is on the interference filter 5. The wavelengths of the light hitting the interference filter 5 matches the pass band of the interference filter 5. Along its optical path from the light source 2 the light hitting the detector 4 has been reflected once in each one of the first reflector, the second reflector, and the third reflector, and has passed through the interference filter 5. Along its optical path the light has interacted with the gas in the optical path. As can be seen in FIG. 1 the light source 2, the second reflector 8, and the detector 4 are arranged on the common base 6.

In the embodiment shown in FIG. 1 the first reflector 7, the second reflector 8 and the third reflector 9 are all spherical reflectors with the same radius of curvature. The centre of curvature C1 of the first reflector 7 is separated with a distance D from the centre of curvature C2 of the third reflector 9. This separation distance D is the reason why the second light spot 11 is at a distance from the first light spot 10.

It is not necessary to arrange the interference filter 5 in front of the detector 4 as shown in FIG. 1. As an alternative it is possible to arrange the interference filter 5' after the light source 2 as is shown by the dashed line in FIG. 1. According to this alternative the interference filter 5 also is configured to transmit a first wavelength portion of the light and to reflect or absorb light outside of the first wavelength portion.

As another alternative it is possible to arrange one of the reflectors 7, 8, 9, preferably the second reflector 8, as the interference filter 5". According to this alternative the interference filter is configured to reflect the first wavelength portion of the light and to transmit or absorb light outside of the first wavelength portion. If the light outside of the first wavelength portion is transmitted through any one of the reflectors said light is preferably absorbed in a suitable absorption means (not shown in FIG. 1). A person skilled in the art would easily implement such an absorption means.

In case the second reflector 8 is arranged as the interference filter 5", the second reflector is preferably flat as it is difficult and costly to manufacture a curved interference filter 5".

As described above the detector 4 is arranged such that it is illuminated by light, which in its optical path from the light source has been reflected once in each one of the first reflector 7, the second reflector 8, and the third reflector 9, and has passed through the interference filter 5. The gas sensor is arranged such that gas to be sensed may enter into the optical path, i.e., into the volume delimited mainly by the common base 6, the first reflector 7, and the third reflector 9. The passage of gas into the optical path may be enabled in one of many different ways.

The light source may according to one alternative comprise a black body radiator and a filter arranged to transmit mid-IR radiation. The black body radiator may be a light bulb.

According to another alternative the light source may be a quantum photo diode, which is a form of light emitting diode (LED). The quantum photo diode may for example be based on a combination of aluminium, indium and antimony.

According to another alternative the light source may be a heat membrane emitter, or a filament lamp. The lamp may be miniaturized.

Figure 2:
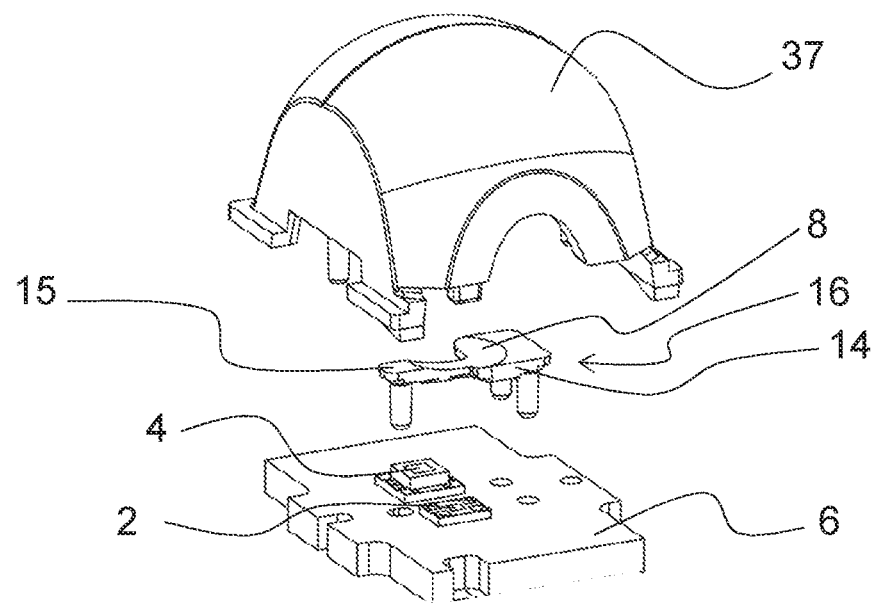
FIG. 2 is an exploded view of a gas sensor according to another embodiment.

FIG. 2 is an exploded view of a gas sensor according to another embodiment of the present invention. The gas sensor comprises a common base 6 on which a light source 2 and a detector 4 are arranged side by side. The base 6 is attachable to, e.g., a printed circuit board (not shown). As can be seen in FIG. 2 the light source 2 is arranged with its surface slightly lower than the surface of the detector 4. This prevents any direct light from the light source 2 to hit the detector 4. The second reflector 8 is arranged on a T-shaped support 14, which is to be arranged with the central portion or stem 15 between the light source 2 and the detector 4 and with the head portion 16 of the T-shape on the side of the light source 2 and the detector 4. The reflector 8 consists of a metallic layer on the central concave portion of the T-shaped support. The gas sensor also comprises a cover in the form of a reflector base 17 which is to be attached to the common base 6. The reflector base 37 may be manufactured as a moulded part. Preferably the reflector base 37 is moulded in plastic, but it is of course possible to use other materials than plastic.

Figure 3:
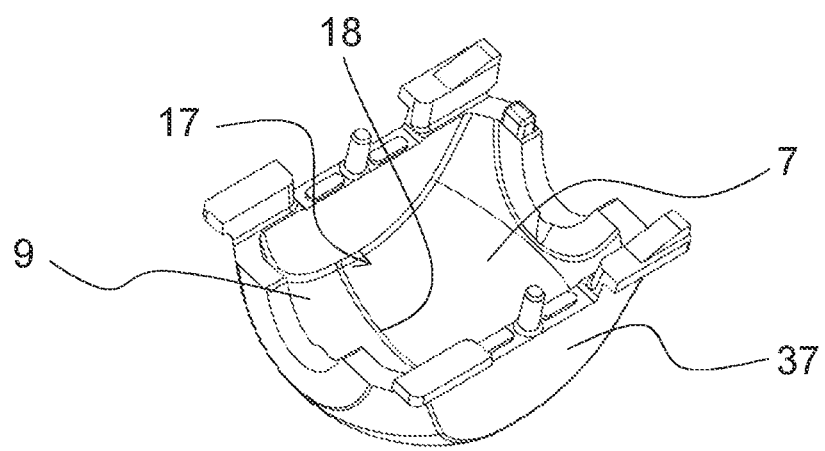
FIG. 3 shows the inside of the reflector base in the embodiment of FIG. 2.

FIG. 3 shows the inside of the reflector base 37 in the embodiment of FIG. 2. The inside of the reflector base has a dome shaped surface 17 on which the first and third reflectors 7, 9 are attached. The first reflector 7 and the third reflector 9 have been arranged on the inside of the dome shaped surface 17 by the application of at least one reflective layer on the dome shaped surface 17. In the embodiment of FIG. 3 the first reflector 7 and the third reflector 9 are separated by a thin line 18 such that the reflectors are separate layers. The dome shaped surface 17 is, however, sufficient to delimit the first reflector 7 from the third reflector 9.

Figure 4:
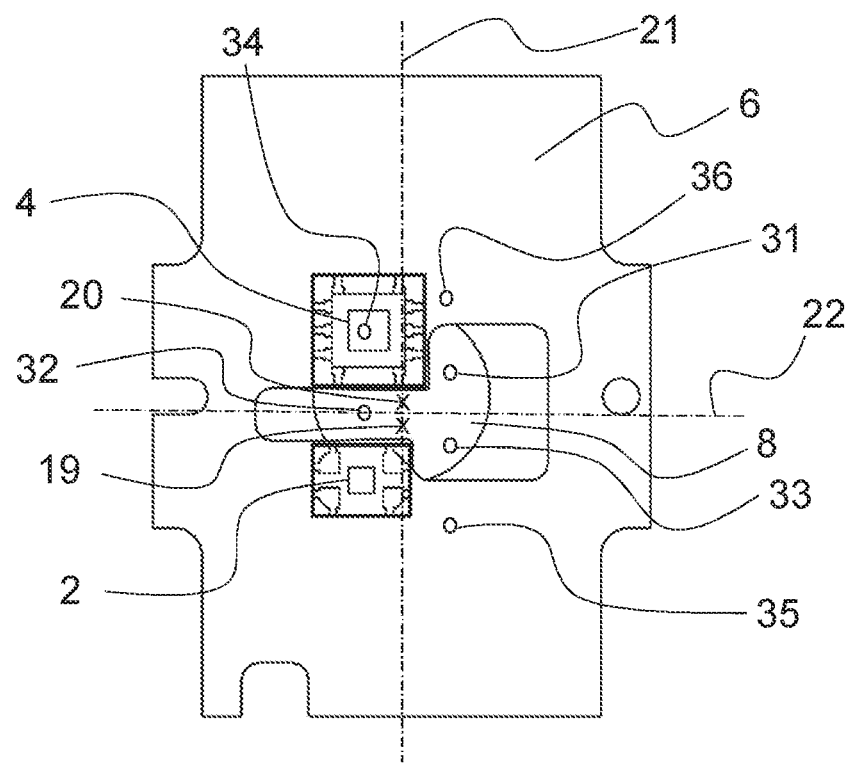
FIG. 4 shows in a top view the base with a light source and a detector.

FIG. 4 shows in a top view the common base 6 on which the light source 2 and the detector 4 are arranged side by side with the second reflector 8 arranged partly between the light source 2 and the detector 4. The first reflector, the second reflector, and the third reflector has a respective centre of curvature, wherein the centre of curvature 19 of the first reflector 7 is at a distance from the centre of curvature 20 of the third reflector 9, said centres of curvature forming a first axis 21. Also shown in FIG. 4 is a second axis 22 which is perpendicular to the first axis 21. The centre of the light source 2 is displaced from the centre of curvature 21 for the first reflector 7 (FIG. 3). The centre of the light source 2 is displaced from the centre of curvature 19 for the first reflector 7 along the first axis 21 as well as transverse to the first axis 21, i.e. along the second. Symmetrically, the centre of the light source is also displaced from the centre of curvature 20 for the third reflector 9 along the first axis 21 as well as transverse to the centre axis 21, i.e. along the second axis 22. In the embodiment of FIG. 4 the light source is arranged further from the centre of curvature 20 for the third reflector 9 than from the centre of curvature 19 for the first reflector 7. Alternatively, it is possible to arrange the first reflector 7 and the third reflector 9 such that the light source 2 is closer to the centre of curvature 20 for the third reflector 9 than the centre of curvature 19 for the first reflector 7. Such an arrangement will result in the first reflector occupying a slightly smaller solid angle seen from the light source 2, and thus also a slightly lower efficiency.

Figure 5:
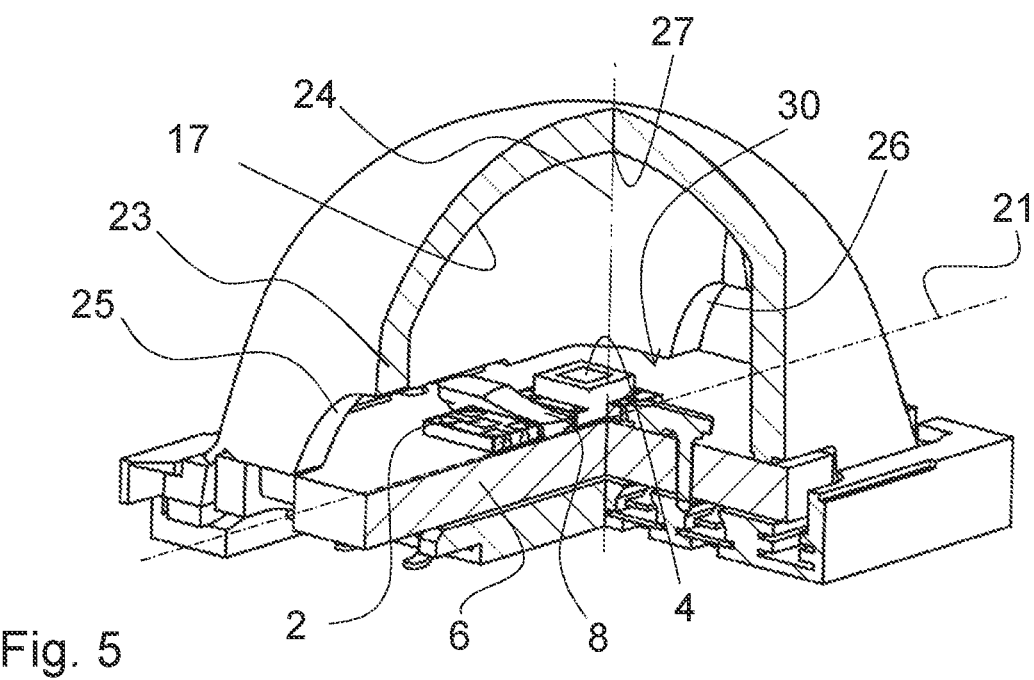
FIG. 5 shows schematically the gas sensor of FIG. 2 in partial cross section.

FIG. 5 shows schematically the gas sensor of FIG. 2 in partial cross section. The reflector base 37 is attached to the base 6 on which the light source 2 and the detector 4 are arranged side by side with the second reflector 8 arranged partly between the light source 2 and the detector 4. The first axis 21 is also shown in FIG. 5. As can be seen in FIG. 5 the reflector base 37 comprises a first wall 23, and a second wall 24, which are arranged opposite to each other on either side of the first axis 21. The first wall 23 is perforated by a first plurality of openings 25, and the second wall is perforated by a second plurality of openings 26. The first plurality of openings 25 and the second plurality of openings 26 enable gas from the surroundings to pass into the gas sensor. It is of course possible to omit the first wall 23 and the second wall 24 entirely, but the perforated walls give some structural rigidity to the reflector base 37. The centre of curvature 27 of the second reflector 8 is centred at the top of the dome shaped surface 17.

The radii of curvature of the first reflector, the second reflector, and the third reflector are essentially equal. It is possible for the radii of curvature of the reflectors to differ slightly, but it is advantageous if they are equal as the optical properties of the gas sensor then are optimized. The surface of the light source 2, the surface of the detector 4, the centre of curvature 19 of the first reflector 7 and the centre of curvature 20 of the third reflector 9 are in a common plane 30. The common plane 30 is arranged such that a normal to the dome shaped surface 17 of the reflector base 37 at the centre of curvature 27 of the second reflector 8 is essentially perpendicular to the common plane 30. This is preferable in case the first reflector 7 and the third reflector 9 are aspherical such as ellipsoid reflectors. At least one, preferably all, of the first reflector, the second reflector and the third reflector are spherical reflectors. Spherical reflectors are less sensitive to the configuration in relation to the common plane 30.

In order to maximize the performance of the gas sensor 1, each one of the first reflector and the third reflector occupies a solid angle of at least 1 steradian, preferably at least 2 steradians seen from the centre of curvature of the respective reflector 7, 9.

With reference again to FIG. 4, in the shown embodiment the light from the light source 2 will be reflected in the first reflector 7 to a first light spot 31 positioned on the second reflector 8 on the opposite side of the first axis 21. The first light spot is reflected in the third reflector 9 (FIG. 3) to a second light spot 32 positioned on the second reflector 8 between the light source 2 and the detector 4. The second light spot 32 is reflected in the first reflector 7 to a third light spot 33 on the opposite side of the first axis 21 between the second light spot 32 and the light source 2 in the direction along the first axis 21. The third light spot 33 is reflected in the third reflector 9 to a fourth light spot 34 on the detector 4. The many reflections result in a long optical path through the gas, which results in a high sensitivity of the gas sensor 1. In case a mirror was present at the position of the detector 4 in FIG. 4 the light spot would be reflected in the first reflector 7 to a fifth light spot 35. The detector could be positioned at the position of the second light spot, the third light spot 33 or the position of the fifth light spot. However, especially the fifth light spot is very close to the light source which makes the arrangement of a detector at that position difficult. Also, due to losses, mainly due to the limited solid angle of the first reflector and the third reflector, the intensity of each consecutive light spot decreases. The light source emits radiation into a half sphere, i.e., into 2n ster. In case the first reflector is assumed to occupy a solid angle of 1.5 steradian only 25% of the flux from the light source 2 hits the first reflector 7. In case the area of the light source is 1×1 mm and assumed to occupy 3×5 mm, and the area of the detector is assumed to be the same but occupy 4×6 mm, and the path length from the light source 2 to the first light spot being 14 mm, this will result in a total flux at a detector at the first light spot 31 of no more than 20%. At the second light spot 32 the maximum total flux is 17%, at the third light spot 33 the maximum total flux is 16%, at the fourth light spot 34 the maximum total flux is 11% and at the fifth light spot 35 it is 6%. The fast drop in flux between the third light spot 33 and the fourth light spot 34 and between the fourth light spot 34 and the fifth light spot 35 is due to the quality of the light spot deteriorating for an increasing number of reflections mainly due to spherical aberrations. Thus, the spot size will increase and much light will miss the detector 4. The detector 4 is arranged such that the fourth light spot 34 is on the detector. For this exemplifying gas sensor 1 this is a good compromise in order to achieve a reasonable size of the light spot at the same time as a long absorption path length.

Some of the light from the light source 2 will hit the second reflector and give rise to an additional light spot 36 of so called negative first order. It is possible to position a second detector (not shown) at the position of the additional light spot. A second interference filter with a different pass band may be positioned in front of the second detector for detection of another gas than the first detector 4.

The light source may be is configured to emit mid infrared light, preferably light with a wavelength shorter than 5 μm, which is suitable for detection of, e.g., carbon dioxide.

The light source 2 may comprise a black body radiator and a filter (not shown) arranged to allow only mid infrared light to be emitted from the light source.

The interference filter 5 is preferable a bandpass filter configured to band pass light with a wavelength around 2.66 µm for the detection of an $H_2O$ peak, around 3.32 µm for the detection of a methane peak, around 4.26 µm for the detection of a $CO_2$ peak, or around 4.50 µm for the detection of an $N_2O$ peak.

In favourable cases, such as when a photo diode 4 and LED 2 pair together limit the wavelength sensitivity range enough, the interference filter may be omitted.

During operation of the gas sensor an increase of the concentration of the measured gas will lead to a decreased signal at the detector.

The above described embodiments may be amended in many ways without departing from the scope of the invention, which is limited only by the appended claims.

It is for example possible to arrange the detector at the position of a sixth light spot or higher order.

The invention claimed is:

1. A gas sensor comprising:
   a light source configured to emit light, and a detector configured to detect light, wherein the light source and the detector are arranged side by side,
   a first reflector, which is concave and arranged to reflect and concentrate light emitted from the light source to a first light spot, on the side of the light source, wherein the gas sensor is configured for detection of a first wavelength portion of the light, characterised in that it comprises
   a second reflector,
   a third reflector, which is concave, and
   a reflector base with a dome shaped surface facing the light source and the detector,
   wherein the first reflector and the third reflector are arranged as reflective surfaces on the dome shaped surface,
   wherein the second reflector and the third reflector are arranged such that the first light spot is on the second reflector and light reflected from the first light spot onto the third reflector is reflected and concentrated by the third reflector to a second light spot on the side of the first light spot,
   wherein the gas sensor is arranged such that, during operation of the gas sensor, the detector is illuminated by light from the light source, which in an optical path from the light source has been reflected at least once in each one of the first reflector, the second reflector, and the third reflector, and
   wherein the gas sensor is arranged such that gas to be sensed may enter into the optical path.

2. The gas sensor according to claim 1, wherein the reflector base is formed as a unitary element.

3. The gas sensor according to claim 1, wherein the light source is configured to emit un-collimated light.

4. The gas sensor according to claim 1, comprising an interference filter configured for a first wavelength portion of the light, wherein the gas sensor is arranged such that, during operation of the gas sensor, the detector is illuminated by light from the light source, which has been filtered by the interference filter.

5. The gas sensor according to claim 4, wherein the interference filter is arranged in front of the detector and is configured to only transmit the first wavelength portion of the light.

6. The gas sensor according to claim 4, wherein the interference filter is arranged after the light source and is configured to only transmit the first wavelength portion of the light.

7. The gas sensor according to claim 4, wherein the interference filter is arranged as one of the reflectors and is configured to only reflect the first wavelength portion of the light.

8. The gas sensor according to claim 7, wherein the interference filter is arranged as the second reflector.

9. The gas sensor according to claim 4, wherein the interference filter is a bandpass filter configured to band pass light with a wavelength around 2.66 µm for the detection of an $H_2O$ peak, around 3.32 µm for the detection of a methane peak, around 4.26 µm for the detection of a $CO_2$ peak, or around 4.50 µm for the detection of an $N_2O$ peak.

10. The gas sensor according to claim 1, wherein the second reflector is flat.

11. The gas sensor according to claim 1, wherein the second reflector is concave.

12. The gas sensor according to claim 1, wherein the detector is arranged such that the second light spot is on the detector.

13. The gas sensor according to claim 1, wherein the second reflector is arranged such that the second light spot is on the second reflector, and wherein light reflected from the second light spot on the second reflector, is reflected via the first reflector to a third light spot on the second reflector, and reflected from the second reflector via the third reflector to a fourth light spot.

14. The gas sensor according to claim 13, wherein the detector is arranged such that the fourth light spot is on the detector.

15. The gas sensor according to claim 1, wherein each one of the first reflector, the second reflector, and the third reflector has a respective centre of curvature, wherein the centre of curvature of the first reflector is at a distance from the centre of curvature of the third reflector, said centres of curvature forming a first axis, wherein the centre of the light source is displaced from the centre of curvature for the first reflector.

16. The gas sensor according to claim 15, wherein the centre of the light source is displaced from the centre of curvature for the first reflector along the first axis as well as transverse to the first axis.

17. The gas sensor according to claim 15 or 16, wherein the radii of curvature of the first reflector, the second reflector, and the third reflector are essentially equal.

18. The gas sensor according to claim 1, wherein at least one, preferably all of the first reflector, the second reflector and the third reflector are spherical reflectors.

19. The gas sensor according to claim 1, wherein each one of the first reflector, and the third reflector occupies a solid angle of at least 1 steradian, preferably at least 2 steradians seen from the centre of curvature of the respective reflector.

20. The gas sensor according to claim 1, wherein the light source is configured to emit mid infrared light, preferably light with a wavelength shorter than 5 µm.

21. The gas sensor according to claim 1, wherein the light source comprise a black body radiator and a filter arranged to allow only mid infrared light to be emitted from the light source.

22. The gas sensor according to claim 1, wherein the reflector base is made from moulded plastic.

23. The gas sensor according to claim 22, wherein the light psource, the detector and the second reflector are arranged on a common base, wherein the reflector base is attached to the common base to form the gas sensor.

* * * * *

UNITED STATES PATENT AND TRADEMARK OFFICE
CERTIFICATE OF CORRECTION

| | | |
|---|---|---|
| PATENT NO. | : 11,747,274 B2 | |
| APPLICATION NO. | : 17/904946 | |
| DATED | : September 5, 2023 | |
| INVENTOR(S) | : Hans Martin | |

It is certified that error appears in the above-identified patent and that said Letters Patent is hereby corrected as shown below:

In the Specification

Column 1, Line 28, delete "the an" and insert -- an --.

Column 2, Line 30, delete "characterised_in" and insert -- characterised in --.

Column 4, Line 53, delete "by" and insert -- be --.

In the Claims

Column 12, Line 47, Claim 17, delete "claim 15 or 16," and insert -- claim 15, --.

Column 12, Line 67, Claim 23, delete "psource," and insert -- source, --.

Signed and Sealed this
Fifteenth Day of October, 2024

Katherine Kelly Vidal
*Director of the United States Patent and Trademark Office*